(12) United States Patent
Noor et al.

(10) Patent No.: US 10,835,872 B2
(45) Date of Patent: Nov. 17, 2020

(54) MACROPOROUS OR MESOPOROUS POLYMER FILMS IN HOLLOW FIBER GEOMETRY

(71) Applicant: Helmholtz-Zentrum Geesthacht Zentrum für Material- und Küstenforschung GmbH, Geesthacht (GB)

(72) Inventors: Nazia Noor, Geesthacht (DE); Volker Abetz, Lüneburg (DE); Joachim Koll, Schwarzenbek (DE)

(73) Assignee: Helmholtz-Zentrum Geesthacht Zentrum Fuer Material- und Kuestenforschung GmbH (DE)

( * ) Notice: Subject to any disclaimer, the term of this patent is extended or adjusted under 35 U.S.C. 154(b) by 99 days.

(21) Appl. No.: 16/307,627

(22) PCT Filed: Apr. 26, 2018

(86) PCT No.: PCT/EP2018/060705
§ 371 (c)(1),
(2) Date: Dec. 6, 2018

(87) PCT Pub. No.: WO2018/202533
PCT Pub. Date: Nov. 8, 2018

(65) Prior Publication Data
US 2019/0299166 A1    Oct. 3, 2019

(30) Foreign Application Priority Data
May 2, 2017    (EP) .................................... 17168979

(51) Int. Cl.
*B01D 67/00*    (2006.01)
*B01D 69/08*    (2006.01)
(Continued)

(52) U.S. Cl.
CPC ..... *B01D 67/0013* (2013.01); *B01D 67/0016* (2013.01); *B01D 69/085* (2013.01);
(Continued)

(58) Field of Classification Search
None
See application file for complete search history.

(56) References Cited

U.S. PATENT DOCUMENTS

| | | | |
|---|---|---|---|
| 3,615,024 | A | 10/1971 | Michaels |
| 4,276,172 | A | 6/1981 | Henne |

(Continued)

FOREIGN PATENT DOCUMENTS

| | | |
|---|---|---|
| CA | 2886437 A1 | 5/2014 |
| EP | 0277619 A2 | 8/1988 |

(Continued)

OTHER PUBLICATIONS

European communication dated Oct. 16, 2017 in corresponding European patent application No. 17168979.7.
(Continued)

*Primary Examiner* — Krishnan S Menon
(74) *Attorney, Agent, or Firm* — Nields, Lemack & Frame, LLC (57) ABSTRACT

The present invention is directed towards a method for the preparation of macroporous or mesoporous polymer films in hollow fiber geometry. The method according to the present invention reliably produces macroporous or mesoporous homopolymer or copolymer films in hollow fiber geometry having an ordered porous structure. Preferably, the pores are isoporous. The method involves the purging or casting a polyol adjacent to a film forming polymer solution of at least one homopolymer or at least one copolymer in a suitable solvent while polyol diffuses in and then condenses out of the film forming solution before the solution is immersed
(Continued)

into a coagulation bath. The methods also require the presence of a carrier solution or carrier substrate during spinning or casting. The method makes macroporous or mesoporous film formation possible with a single step processing method.

11 Claims, 3 Drawing Sheets

(51) Int. Cl.
*B01D 71/16* (2006.01)
*B01D 71/80* (2006.01)
*C08L 1/14* (2006.01)
*C08L 25/06* (2006.01)
*C08L 27/16* (2006.01)
*C08L 33/18* (2006.01)
*C08L 79/08* (2006.01)
*B01D 69/10* (2006.01)

(52) U.S. Cl.
CPC .......... *B01D 69/088* (2013.01); *B01D 71/16* (2013.01); *B01D 71/80* (2013.01); *C08L 1/14* (2013.01); *C08L 25/06* (2013.01); *C08L 27/16* (2013.01); *C08L 33/18* (2013.01); *C08L 79/08* (2013.01); *B01D 69/10* (2013.01); *B01D 2323/18* (2013.01); *B01D 2325/021* (2013.01); *C08L 2203/16* (2013.01)

(56) References Cited

U.S. PATENT DOCUMENTS

| | | |
|---|---|---|
| 4,385,017 A | 5/1983 | Joh et al. |
| 4,702,836 A | 10/1987 | Mutoh et al. |
| 5,066,401 A | 11/1991 | Muller et al. |
| 6,024,872 A | 2/2000 | Mahendran et al. |
| 7,247,238 B2 | 7/2007 | Mullette et al. |
| 2006/0266463 A1 | 11/2006 | Washizu et al. |
| 2014/0326659 A1 | 11/2014 | Xiao et al. |

FOREIGN PATENT DOCUMENTS

| | | |
|---|---|---|
| JP | 58-98105 A | 6/1983 |
| WO | 2007/007051 A1 | 1/2007 |
| WO | 2014/079538 A1 | 5/2014 |

OTHER PUBLICATIONS

International Search Report and Written Opinion dated Aug. 1, 2018 in corresponding PCT application No. PCT/EP2018/060705.
Noor et al., "A Facile Method to Prepare Double-Layer Isoporous Hollow Fiber Membrane by In Situ Hydrogen Bond Formation in the Spinning Line", Macromolecular Rapid Communications, vol. 37, No. 5, pp. 414-419, 2016.
Sing et al., "Reporting Physisorption Data for Gas/Solid Systems with Special Reference to the Determination of Surface Area and Porosity", Pure & Applied Chemistry, vol. 57, No. 4, pp. 603-619, 1985.
Srinivasarao et al., "Three-Dimensionally Ordered Array of Air Bubbles in a Polymer File", Science, vol. 292, pp. 79-83, Apr. 6, 2001.
Wang et al., "Diffuse-In/Condense-Out Behavior of Glycerol Induces Formation of Composite Membranes with Uniform Pores", Macromolecular Materials and Engineering, vol. 301, No. 1, pp. 36-41, 2016.
Widawski et al., "Self-Organized Honeycomb Morphology of Star-Polymer Polystyrene Films", Nature, vol. 369, pp. 387-389, Jun. 2, 1994.

MACROPOROUS OR MESOPOROUS POLYMER FILMS IN HOLLOW FIBER GEOMETRY

FIELD OF INVENTION

The present invention relates to a method of making macroporous or mesoporous films in hollow fiber geometry with polymers.

BACKGROUND OF THE INVENTION

Macro or mesoporous polymeric films have recently gained interest due to their potential use in many fields. For example, these films may be used as supporting materials in tissue engineering, as inorganic growth templates, as optical materials, as antireflection coatings, in catalysis, as bio or gas sensors, as dielectric materials for electronic devices, as stamps for soft lithography, or as etching masks. Several methods are known for isoporous structure formation in macroporous or mesoporous films from both homopolymers and copolymers. The methods include annealing, lithography, electron beam sculpting, track etching, self assembly followed by selective etching or non-solvent induced phase separation, or by the so-called "breath figure assembly" method (G. Widawski et al. "Self-organized honeycomb morphology of star-polymer polystyrene films", Nature, 1994, 369, 387). A carbon disulphide solution of star-shaped polystyrene was cast on solid substrates with a moist airflow across the polymer solution surface to create porous polymer films with monodisperse pore size. The polystyrene self-assembles into an ordered pattern with hexagonally arranged pores ranging from 0.2-10 µm in diameter.

A continuous process of producing a honeycomb structure in flat sheet geometry films is known from US 2006/0266463 A1.

In many cases, only two-dimensional, i.e. single-layer, arrays of pores were obtained at the film surface. Three-dimensional structures, however, composed of several layers of air-bubble sheets, are also known (cf. M. Srinivasarao et al., "Three-dimensionally ordered array of air bubbles in a polymer film", Science, 2001, 292, 79). Air bubbles generally are of a larger diameter inside the film with the smaller diameter top open at the film surface. Different pore sizes from 0.2 to 20 µm in diameter have been reported in the literature. When referring to the reported values of pore sizes, two measurements have been used to represent the pore diameter. One measurement refers to the diameter of the top opening of the pores, and the other is the maximum pore diameter of the pores, which is below the film surfaces.

The main factors known to affect the formation and size of the pores are casting conditions, including solution concentration, and the nature of the material systems. Casting conditions such as humidity and airflow speeds have effects on the size of the air pores and the morphology of the cast films. Generally, increased humidity and reduced airflow lead to large air bubbles. The pore size can be adjusted by changing the airflow or concentration of the prepared polymer solutions.

Thus far macroporous or mesoporous polymeric films have been produced in flat sheet geometry. Techniques for producing hollow fiber membranes, where the pores are connected to extend throughout the whole width of the polymer layer, are, however, known.

Z.-H. Wang et al. "Diffuse-In/Condense-Out Behavior of Glycerol Induces Formation of Composite Membranes with Uniform Pores", Macromolecular Materials and Engineering 2016, pages 36-41 discloses a method of producing composite polymer films with uniform pores in their surface layers. Cellulose acetate (CA) solution was spin-casted on a porous substrate filled with glycerol, with the evaporation of the volatile solvent of CA, the nonvolatile glycerol in the substrate firstly diffuses up into the CA solution layer and then condenses out and arranges into uniform droplets on the casted layer. The glycerol droplets act as template for the precipitation of the CA molecules and thus result in the formation of the uniform pores in the CA layer. A spin casting process, as described in Z.-H. Wang et al. is designed for non-continuous production of laboratory-scale membranes in flat sheet geometry. Such spin casting process will not enable a larger-scale continuous production of hollow-fiber membranes.

Polymeric membranes are generally prepared by phase separation of polymer solutions. Phase separation can be induced by cooling or by the presence of precipitant. Precipitant induced phase separation (NIPS) is taught for example in U.S. Pat. Nos. 3,615,024; 5,066,401; and 6,024,872. Thermally induced phase separation (TIPS) is taught for example in U.S. Pat. Nos. 4,702,836 and 7,247,238. Spinnerets are e.g. described in published European Patent Application 0 277 619 A2, in U.S. Pat. No. 4,385,017, and in WO 2007/007051, which are all incorporated herein by reference.

US 2014/326659 A1 discloses a preparation method of a polyacrylonitrile hollow fiber membrane, which membrane has a sheath-core structure. A hollow polyacrylonitrile support is knitted by a two-dimensional weaving technology, infiltrated with a weakly polar organic liquid, coating the knitted support by pressing a layer of a polyacrylonitrile casting solution through a die on top of the surface of the knitted support. The weakly polar organic solvent with which the hollow polyacrylonitrile support is infiltrated may be chosen from ethanol, glycerol, isopropanol or polyethylene glycol. US 2014/326659 A1 is not concerned with pore formation in polymer films but is related to only a membrane preparation technique.

Published Canadian Patent Application 2,886,437 A1, which is incorporated herein by reference, discloses a method for producing a hollow-fiber polymer membrane having an isoporous outer skin, a porous inner skin and a sponge-like inner structure.

It is an object of the present invention to produce macroporous or mesoporous films from homopolymers or copolymers in hollow fiber geometry having an ordered porous structure in a reliable manner. Preferably, the pores are isoporous. The method for producing the films should be applicable in a continuous form.

Definitions

In the context of the present invention the term "porous film" or "porous, polymeric film" is meant to designate polymeric films having an upper and lower surface, which films exhibit two-dimensional, i.e. single-layer arrays of pores at the film surface. Preferably, the pores have a larger diameter inside the film with the top open at the film surface. The pores are termed macroporous or microporous, depending on their size, i.e. diameter. The term "macroporous" is meant to designate pores having a mean pore size as determined by electron microscopy in the range of from 50 nm to 10 µm, preferably from 1 µm to 2 µm. The term mesoporous is meant to designate pores having a mean pore size in the range of from 2 nm to less than 50 nm according to IUPAC (International Union of Pure and Applied Chemistry), K. S. W. Sing et al. "*Reporting physisorption data for gas/solid systems with special reference to the determination of surface area and porosity*", Pure Appl. Chem., 1985, 57, 603.

The term "isoporous" is meant to designate pores having pore size dispersity, i.e. ratio of the maximum pore diameter to the minimum pore diameter, of at most 3, preferably at most 2.

The pore sizes and pore size distribution can e.g. be determined using microscopy such as electron microscopy. Scanning electron microscopy was used to take the image of the surface of the film and the size and the distribution of the pores on the surface of the film were determined by using the software IMS V15Q4 available from Imagic Bildverarbeitung AG, Glattbrugg, Switzerland.

The term "polymeric membrane", "porous membrane" or "membrane" as used herein is meant to designate porous films where the pores are connected to extend throughout the entire width of the polymer layer. Although the term porous polymeric films as used herein is not meant to exclude porous polymeric membranes, preferred porous polymeric films are those which do not exhibit pores which are connected to extend throughout the entire width of the polymer layer.

The term "optionally" is meant to indicate that separating the hollow-fiber polymer film from the enclosed carrier is not a necessary method step; and the hollow-fiber polymer film and enclosed carrier may be kept together.

The term "room temperature" is meant to designate the range of air temperatures that people prefer for indoor settings, which feel comfortable when wearing typical indoor clothing. As a medical definition, the range generally considered to be suitable for human occupancy is between 15° C. and 25° C., such as 23° C.

The term "volatile" is meant to designate solvents which is able to evaporate (it has a measurable vapor pressure) at processing temperatures.

The term "carrier substrate" or "support substrate" is meant to designate a hollow fiber support which is formed from the "carrier solution" upon precipitation and which is enclosed by the hollow fiber membrane prepared according to the process of the invention. If desired, the carrier may be removed from the hollow-fiber membrane.

SUMMARY OF THE INVENTION

According to an embodiment, the present invention relates to a method for preparing a polymer film in hollow fiber geometry, comprising:
a. providing a first polymer solution of at least one copolymer or at least one homopolymer in a volatile solvent, providing a carrier solution comprising a polyether sulfone (PES) in a solvent,
   providing a bore fluid and
   providing a polyol which is liquid at room temperature;
b. pressing the first polymer solution (dope) through a fourth die (4) in a spinneret while simultaneously purging the liquid polyol through a third die (3) encircled by the fourth die (4),
   pressing the carrier solution through a second die (2) encircled by the third die (3), and
   purging the bore fluid comprising at least one precipitant through a first, innermost die (1) encircled by the second die (2), and
   subsequently immersing the pressed polymer solutions into an aqueous precipitation bath, wherein a gap is provided between the spinneret and the aqueous precipitation bath through which the extruded first polymer solution passes enclosing the liquid polyol, the carrier solution and the bore fluid to form a fiber precursor;
c. precipitating a fiber precursor in the precipitation bath to form the hollow-fiber polymer film enclosing a carrier a carrier substrate which includes polymerized polyether sulfone (PES) from the carrier solution; and
d. optionally, separating the hollow-fiber polymer film from the enclosed carrier.

Preferably the second (2), third (3) and fourth (4) dies have an annular die exit. However, alternative geometries such as elliptical die exits or a profiled die exits are also conceivable. Accordingly, step b. may comprise pressing the first polymer solution (dope) through a fourth annular die (4) in a spinneret while simultaneously purging the liquid polyol through a third annular die (3) encircled by the fourth annular die (4), pressing the carrier solution through a second annular die (2) encircled by the third annular die (3), and purging the bore fluid comprising at least one precipitant through a first, innermost die (1) encircled by the second annular die (2) and subsequently into an aqueous precipitation bath, wherein a gap is provided between the spinneret and the aqueous precipitation bath through which the pressed first polymer solution passes enclosing the polyol, the carrier solution and the bore fluid to form a fiber precursor.

Without wishing to be bound to any theory, according to the present invention macroporous or mesoporous film formation occurs during evaporation at the film surface of the polymer solution of at least one copolymer or at least one homopolymer while the polyol diffuses into and subsequently condenses out of the first polymer solution of the at least one copolymer or at least one homopolymer. The diffusion of the polyol is at least in part directed towards the polymer solution of the at least one copolymer or at least one homopolymer by the presence of a carrier solution, or carrier (or supporting) substrate.

The method according to the present invention leads to macroporous film formation having a mean pore size as determined by electron microscopy in the range of from 50 nm to 2 μm, preferably from 50 nm to 200 nm, when a copolymer is used, and 1 μm to 2 μm, when a homopolymer is used, with uniform pore sizes, i.e. a ratio of the maximum pore diameter to the minimum pore diameter, of at most 3, preferably at most 2. The method according to the present invention may also lead to mesoporous film formation having a mean pore size in the range of from 2 nm to less than 50 nm. Scanning electron microscopy was used to take the image of the surface of the film and the size and the distribution of the pores were determined by using software IMS V15Q4, available from Imagic Bildverarbeitung AG, Glattbrugg, Switzerland.

Preferably the liquid polyol is selected from glycerol, ethylene glycol and pentaerythritol, most preferably glycerol.

BRIEF DESCRIPTION OF THE DRAWINGS

FIG. 1*a* is a top view of a spinneret having four die gaps through which bore fluid is purged, carrier solution, glycerol (polyol) and first polymer solution (dope) are purged or pressed;

FIG. 1*b* is a cross-sectional view of the spinneret of FIG. 1a;

DETAILED DESCRIPTION OF THE INVENTION

The at least one copolymer or at least one homopolymer used in the first polymer solution for producing films in the hollow-fiber geometry according to the present invention preferably comprises two or more different polymer blocks when block copolymer is used such as blocks A, B; or A, B, C; or A, B, C, D forming block copolymers of the configuration A-B, A-B-A, A-B-C, A-B-C-B-A, A-B-C-D, A-B-C-D-C-B-A or multiblock copolymers based on the aforementioned configurations or random copolymer or homopolymers. Multiblock copolymers comprise structures of the base configurations that repeat multiple times. The polymer blocks are preferably selected from the group consisting of polystyrene, poly(α-methylstyrene), poly(para-methylstyrene), poly(t-butyl styrene), poly(trimethylsilylstyrene), poly(4-vinylpyridine), poly(2-vinylpyridine), poly(vinyl cyclohexane), polybutadiene, polyisoprene, poly(ethylene-stat-butylene), poly(ethylene-alt-propylene), polysiloxane, poly(alkylene oxide) such as poly(ethylene oxide), poly-ε-caprolactone, polylactic acid, poly(alkyl methacrylate) such as poly(methyl methacrylate), polymethacrylic acid, poly(alkyl acrylate) such as poly(methyl acrylate), poly(acrylic acid), poly(hydroxyethyl methacrylate), polyacrylamide, poly-N-alkylacrylamide, polysulfone, polyaniline, polypyrrole, polytriazole, polyvinylimidazole, polytetrazole, polyethylene diamine, poly(vinyl alcohol), poly-vinylpyrrolidone, polyoxadiazole, polyvinylsulfonic acid, polyvinyl phosphonic acid or polymers.

Preferred block copolymers for use in the present invention are selected from polystyrene-b-poly(4-vinylpyridine) copolymers, poly(α-methylstyrene)-b-poly(4-vinylpyridine) copolymers, poly(para-methylstyrene)-b-poly(4-vinylpyridine) copolymers, poly(t-butylstyrene)-b-poly(4-vinylpyridine) copolymers, poly(trimethylsilylstyrene)-b-poly(4-vinylpyridine) copolymers, polystyrene-b-poly(2-vinylpyridine) copolymers, poly(α-methylstyrene)-b-poly(2-vinylpyridine) copolymers, poly(para-methylstyrene)-b-poly(2-vinylpyridine) copolymers, poly(t-butylstyrene)-b-poly(2-vinylpyridine) copolymers, poly(trimethylsilylstyrene)-b-poly(2-vinylpyridine) copolymers, polystyrene-b-polybutadiene copolymers, poly(α-methylstyrene)-b-polybutadiene copolymers, poly(para-methylstyrene)-b-polybutadiene copolymers, poly(t-butylstyrene)-b-polybutadiene copolymers, poly(trimethylsilylstyrene)-b-polybutadiene copolymers, polystyrene-b-polyisoprene copolymers, poly(α-methylstyrene)-b-polyisoprene copolymers, poly(para-methylstyrene)-b-polyisoprene copolymers, poly(t-butylstyrene)-b-polyisoprene copolymers, poly(trimethylsilyl-styrene)-b-polyisoprene copolymers, polystyrene-b-poly(ethylene-stat-butylene) copolymers, poly(α-methylstyrene)-b-poly(ethylene-stat-butylene) copolymers, poly(para-methylstyrene)-b-poly(ethylene-stat-butylene) copolymers, poly(t-butylstyrene)-b-poly(ethylene-stat-butylene) copolymers, poly(trimethylsilylstyrene)-b-poly(ethylene-stat-butylene) copolymers, polystyrene-b-(ethylene-alt-propylene) copolymers, poly(α-methylstyrene)-b-(ethylene-alt-propylene) copolymers, poly(para-methylstyrene)-b-(ethylene-alt-propylene) copolymers, poly(t-butylstyrene)-b-(ethylene-alt-propylene) copolymers, poly(trimethylsilylstyrene)-b-(ethylene-alt-propylene) copolymers, polystyrene-b-polysiloxane copolymers, poly(α-methylstyrene)-b-polysiloxane copolymers, poly(para-methylstyrene)-b-polysiloxane copolymers, poly(t-butylstyrene)-b-polysiloxane copolymers, poly(trimethylsilylstyrene)-b-polysiloxane copolymers, polystyrene-b-polyalkylene oxide copolymers, poly(α-methylstyrene)-b-polyalkylene oxide copolymers, poly(para-methylstyrene)-b-polyalkylene oxide copolymers, poly(t-butylstyrene)-b-polyalkylene oxide copolymers, poly(trimethyl-silylstyrene)-b-polyalkylene oxide copolymers, polystyrene-b-poly-ε-caprolactone copolymers, poly(α-methylstyrene)-b-poly-ε-caprolactone copolymers, poly(para-methylstyrene)-b-poly-ε-caprolactone copolymers, poly(t-butylstyrene)-b-poly-ε-caprolactone copolymers, poly(trimethylsilylstyrene)-b-poly-ε-caprolactone copolymers, polystyrene-b-poly(methyl methacrylate) copolymers, poly(α-methylstyrene)-b-poly(methyl methacrylate) copolymers, poly(para-methylstyrene)-b-poly(methyl methacrylate) copolymers, poly(t-butylstyrene)-b-poly(methyl methacrylate) copolymers, poly(trimethylsilylstyrene)-b-poly(methyl methacrylate) copolymers, polystyrene-b-poly(methyl acrylate) copolymers, poly(α-methylstyrene)-b-poly(methyl acrylate) copolymers, poly(para-methylstyrene)-b-poly(methyl acrylate) copolymers, poly(t-butylstyrene)-b-poly(methyl acrylate) copolymers, poly(trimethylsilylstyrene)-b-poly(methyl acrylate), polystyrene-b-poly(hydroxyethyl methacrylate) copolymers, poly(α-methylstyrene)-b-poly(hydroxyl-ethyl methacrylate) copolymers, poly(para-methylstyrene)-b-poly(hydroxyethyl methacrylate) copolymers, poly(t-butylstyrene)-b-poly(hydroxyethyl methacrylate) copolymers, poly(trimethylsilylstyrene)-b-poly(hydroxyethyl methacrylate) copolymers, polystyrene-b-polyacrylamide copolymers, poly(α-methylstyrene)-b-polyacrylamide copolymers, poly(para-methylstyrene)-b-polyacrylamide copolymers, poly(t-butylstyrene)-b-polyacrylamide copolymers, poly(trimethylsilylstyrene)-b-polyacrylamide copolymers, polystyrene-b-poly(vinyl alcohol) copolymers, poly(α-methylstyrene)-b-poly(vinyl alcohol) copolymers, poly(para-methylstyrene)-b-poly(vinyl alcohol) copolymers, poly(t-butylstyrene)-b-poly(vinyl alcohol) copolymers, poly(trimethylsilylstyrene)-b-poly(vinyl alcohol) copolymers, polystyrene-b-poly-vinylpyrrolidone copolymers, poly(α-methylstyrene)-b-poly-vinylpyrrolidone copolymers, poly(para-methylstyrene)-b-poly-vinylpyrrolidone copolymers, poly(t-butylstyrene)-b-poly-vinylpyrrolidone copolymers, poly(trimethylsilylstyrene)-b-poly-vinylpyrrolidone copolymers, polystyrene-b-poly-vinylcyclohexane copolymers, polystyrene-b-poly-vinylcyclohexane copolymers, polystyrene-b-poly(vinylcyclohexane) copolymers, polystyrene-b-poly-vinylcyclohexane copolymers, poly(trimethylsilylstyrene)-b-poly(vinyl-cyclo-hexane) copolymers.

The copolymers and the polymer blocks used according to the present invention preferably have a polydispersity of less than 2.5, more preferably of less than 2.2, more preferably of less than 2.0.

The copolymers preferably have a molecular weight between 25 kg/mol and 200 kg/mol, in particular between 75 kg/mol and 150 kg/mol. In this range, the pore size can be adjusted in a particular fine manner through selection of the molecular weight.

The polymer preferably makes up a percentage by weight between 5 wt. % and 20 wt. %, and most preferably between 8 wt. % and 15 wt. % of the polymer solution.

Preferred homopolymers for use in the present invention are selected from cellulose acetate (CA), cellulose acetate butyrate (CAB), polystyrene (PS), polyether sulfone (PES), polysulfone (PSf), polyphenylene sulfone (PPSU), polyetherimide (PEI), polyacrylonitrile (PAN), polyvinyledenefluoride (PVDF), matrimid.

The homopolymers preferably have a molecular weight between 40 kg/mol and 200 kg/mol, in particular between 50 kg/mol and 150 kg/mol. In this range, the pore size can be adjusted in a particular fine manner through selection of the molecular weight. The polymer preferably makes up a percentage by weight between 5 wt. % and 20 wt. %, and most preferably between 8 wt. % and 15 wt. % of the polymer solution.

Several solvents are suitable for preparing the polymer solutions. Preferred solvents include diethyl ether, 1,4-dioxane, tetrahydrofuran (THF), carbon disulfide, acetonitrile, acetone, and/or other low boiling solvent/solvents. Mixture of two or more volatile solvents can be used. Mixture of high boiling solvent/s and low boiling solvent/s can also be used in that case high boiling solvents include dimethyl formamide, dimethyl sulfoxide, dimethyl acetamide, N-methyl-2-pyrrolidone (NMP), etc.

According to a further preferred embodiment of the present invention, the polymer solution comprises at least one metal compound. Preferably the compounds are selected from tetraethyl ortho silicate (TEOS), stannic chloride ($SnCl_4$), chloroauric acid ($HAuCl_4$), titanium tetrachloride ($TiCl_4$). Preferably the metal is selected from main group or transition metals of the periodic system of elements, such as Ti, Sn or Si.

In accordance with a preferred embodiment of the present invention, the first polymer solution (dope), the polyol, and the carrier solution are pressed through their respective dies in the quadruple orifice spinneret with a pressure of 100 to 250 kPa gauge, thereby forming a regular a hollow-fiber precursor.

The gap between the spinneret and the precipitation bath through which the pressed first polymer solution (dope), the polyol, and the carrier solution pass, preferably has a length of between 1 cm and 50 cm, more preferably between 10 cm and 25 cm.

The carrier solution pressed through the second die preferably comprises polyether sulfone (PES), preferably polyether sulfone (PES) in admixture with poly(ethylene glycol) (PEG) and/or a methyl pyrrolidone, such as N-methyl-2-pyrrolidone (NMP). Preferably, the carrier solution also comprises a certain amount of a non-solvent, such as water.

The bore fluid, purged through the first, innermost die preferably comprises a non-solvent, such as water, optionally in admixture with a glycol, such as poly(ethylene glycol) (PEG) and/or a methyl pyrrolidone, such as N-methyl-2-pyrrolidone (NMP). According to a preferred embodiment, the weight ratio of non-solvent, such as water, to other components is higher in the bore fluid than in the carrier solution.

The first polymer solution (dope), pressed through the fourth, outermost die preferably comprises cellulose acetate solution in 1,4-dioxane or comprises a star block polystyrene-b-polybutadiene-b-polystyrene (PS-b-PB-b-PS) copolymer, such as Styro Clear® GH 62 solution, in tetrahydrofuran (THF).

Figure 1:
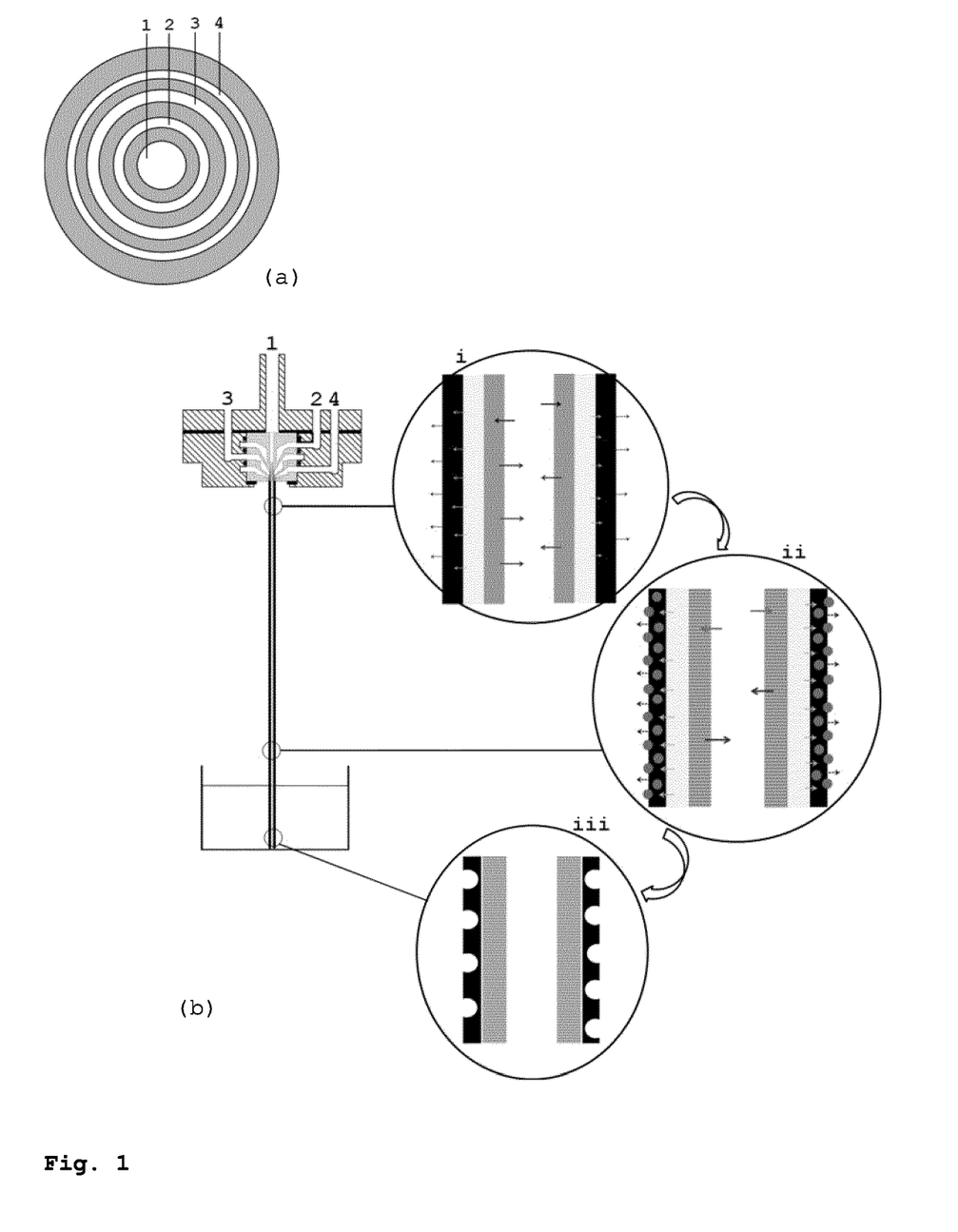

An illustrative setup of an assembly according to an embodiment of the present invention is schematically shown in FIG. 1. FIG. 1 shows a spinneret having four die gaps (1, 2, 3, 4) through which bore fluid is purged, carrier solution, glycerol (polyol) and first polymer solution (dope) are purged or pressed. It is further schematically illustrated that (i) after pressing of the respective layers, solvent contained in the carrier solution diffuses into the bore fluid and solvent contained in the macroporous or mesoporous film forming solution evaporates in the air gap while glycerol (the polyol) diffuses into the macroporous or mesoporous film forming layer; (ii) the glycerol diffused in the film forming layer forms droplets and condenses out of the film forming layer, glycerol droplets act as template for the pore formation in the film forming layer (iii) and the glycerol in the film forming layer is washed out in the coagulation bath leading to macroporous or mesoporous structure.

The dimension of the die gaps of the exemplary quadruple orifice spinneret used in the examples is set out in Table 1.

The invention is further described by the appending examples, which are of illustrative purposes only, and which shall not limit the present invention.

Example 1

Die gap 1: A mixture of water, 1-methyl-2-pyrrolidone (NMP), and poly(ethylene glycol) (PEG400) of molar mass of around 400 g/mol in a weight ratio of 40:30:30, respectively, was prepared for use as a bore fluid. The components were stirred well and kept in rest for removal of entrained bubbles. Thereafter, the solution was filled in a container from where it was purged through the innermost die gap 1 (FIG. 1) of a quadruple orifice spinneret. A gear pump was used for purging the bore fluid at a pre-determined flow rate (g/min).

Die gap 2: The carrier solution was comprised of polyether sulfone (PES) (Ultrason® E6020P), 1-methyl-2-pyrrolidone (NMP), poly(ethylene glycol) (PEG400), and water in a weight basis ratio of 16:40.5:40.5:3 respectively. Firstly polyether sulfone (PES) (Ultrason® E6020P), 1-methyl-2-pyrrolidone (NMP), and poly(ethylene glycol) (PEG400) were dissolved fully in a bottle and water was added dropwise in the dissolved solution afterwards. After the addition of water the solution was stirred overnight and then kept to rest for removal of entrained bubbles. Thereafter, the solution was fed in to a container from where it was pressed through the die gap 2 (FIG. 1) of the quadruple orifice spinneret. A gear pump was used for pressing the solution at a pre-determined flow rate (g/min).

Die gap 3: Glycerol (≥99%) was purged through die gap 3 (FIG. 1) of the quadruple orifice spinneret. An infusion pump was used for purging glycerol from its container syringe to the spinneret at a pre-determined flow rate (ml/min).

Die gap 4: Cellulose acetate (CA 398-30 Eastman) was dissolved in 1,4-dioxane in a weight basis ratio of 8:92 respectively in a closed bottle by stirring overnight. After dissolution, the bottle of the solution was allowed to stand for some hours for removing entrained bubbles. The solution was filled in a container from where it was pressed through the die gap 4 (FIG. 1) of the quadruple orifice spinneret. An infusion pump was used for pressing cellulose acetate (CA 398-30 Eastman) dissolved in 1,4-dioxane at a pre-determined flow rate (ml/min).

Figure 2:
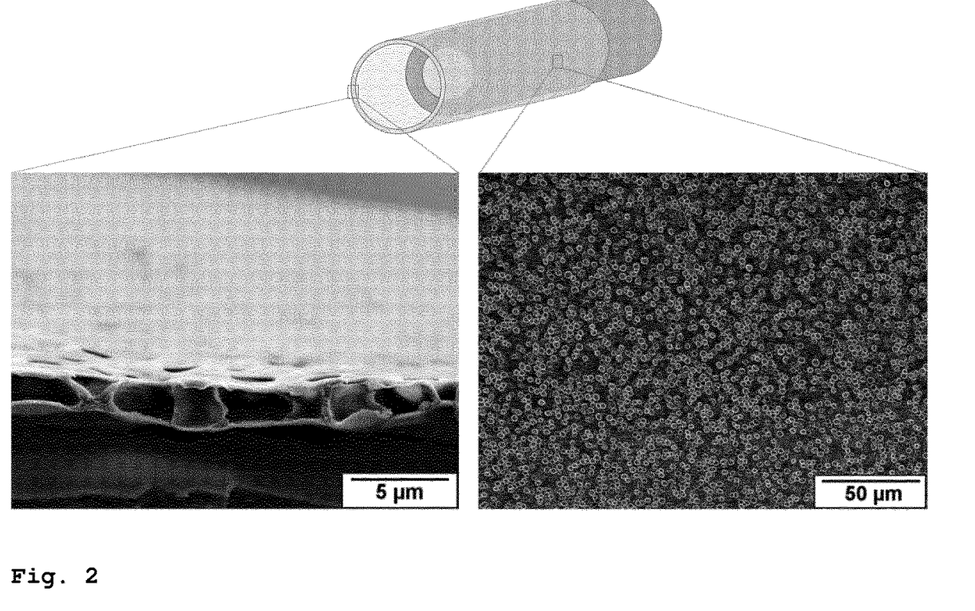
FIG. 2 depicts SEM images of a first hollow fiber of the invention at two locations thereof.

The spinning parameters for Example 1 are tabulated in Table 2 and the results are shown in FIG. 2.

TABLE 1

Dimensions of die gaps in quadruple orifice spinneret

| Die gap No. | Dimension of die gap (mm) |
|---|---|
| 1 | 0.3 |
| 2 | 0.2 |
| 3 | 0.18 |
| 4 | 0.1 |

TABLE 2

Spinning parameters of Example 1

| Die gap No. | Solution purged | Flow Rate | Air gap distance (cm) |
|---|---|---|---|
| 1 | Water/NMP/PEG400 (40/30/30) | 1 g/min | 10 |
| 2 | PES/NMP/PEG400/Water (16/40.5/40.5/3) | 2 g/min | |
| 3 | Glycerol | 0.1 ml/min | |
| 4 | CA/1,4-dioxane (8/92) | 0.1 ml/min | |

Example 2

Die gap 1: Water was filled in a container from where it was purged through die gap 1 (FIG. 1) of the quadruple orifice spinneret. An infusion pump was used for purging water from its container syringe to the spinneret at a pre-determined flow rate (ml/min).

Die gap 2: The carrier solution was comprised of polyether sulfone (PES) (Ultrason® E6020P), 1-methyl-2-pyrrolidone (NMP), poly(ethylene glycol) (PEG400), and water in a weight basis ratio of 16:40.5:40.5:3, respectively. First polyether sulfone (PES) (Ultrason® E6020P), 1-methyl-2-pyrrolidone (NMP), and poly(ethylene glycol) (PEG400) were dissolved fully in a bottle and then water was added dropwise to the dissolved solution. After addition of water the solution was stirred overnight and then kept to rest for removal of entrained bubbles. This solution was fed in to a container from where it was pressed through die gap 2 (FIG. 1) of the spinneret. A gear pump was used for pressing this solution at a pre-determined flow-rate (g/min).

Die gap 3: Glycerol (299%) was purged through die gap 3 (FIG. 1) of the quadruple orifice spinneret. An infusion pump was used for purging glycerol from its container syringe to the spinneret at a pre-determined flow rate (ml/min).

Die gap 4: Cellulose acetate (CA 398-30 Eastman) was dissolved in 1,4-dioxane in a weight basis ratio of 12:88, respectively by stirring overnight in a closed bottle. After dissolution, the bottle of the solution was allowed to stand for some hours for removing entrained bubbles. The solution was filled into a container from where it was pressed through die gap 4 (FIG. 1) of the quadruple orifice spinneret. An infusion pump was used for pressing Cellulose acetate (CA 398-30 Eastman) dissolved in 1,4-dioxane at a pre-determined flow rate (ml/min).

Figure 3:
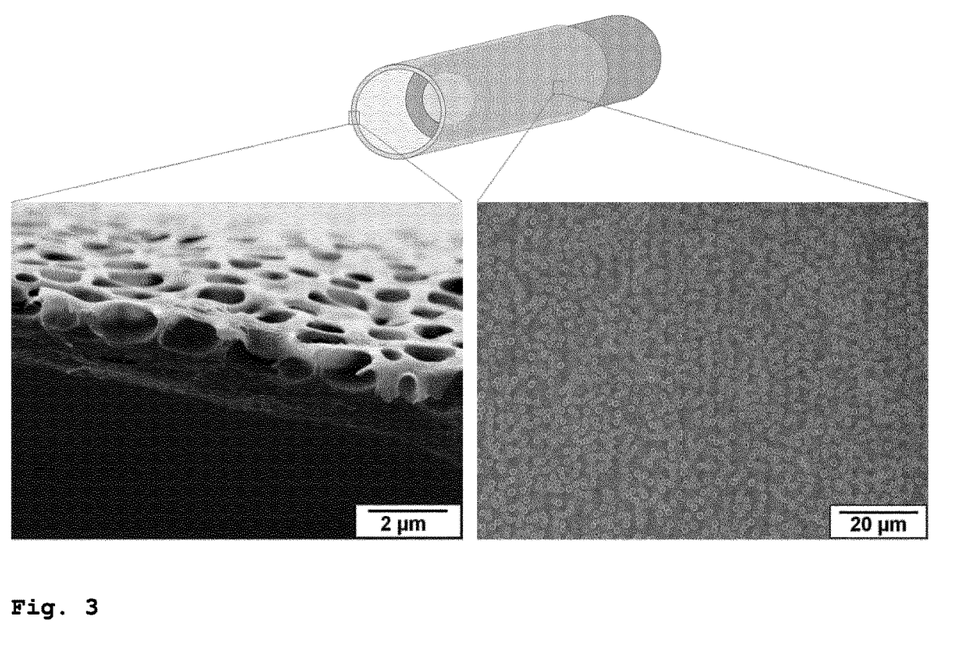
FIG. 3 depicts SEM images of a second hollow fiber of the invention at two locations thereof.

The spinning parameters of this group of experiment are listed in Table 3 and the results are shown in FIG. 3.

TABLE 3

Spinning parameters of Example 2

| Die gap No. | Solution purged | Flow Rate | Air gap distance (cm) |
|---|---|---|---|
| 1 | Water | 1 ml/min | 10 |
| 2 | PES/NMP/PEG400/Water (16/40.5/40.5/3) | 2 g/min | |
| 3 | Glycerol | 0.1 ml/min | |
| 4 | CA/1,4-dioxane (12/88) | 0.1 ml/min | |

Example 3

Die gap 1: A mixture of water, 1-methyl-2-pyrrolidone (NMP), and poly(ethylene glycol) (PEG400) in a weight ratio of 40:30:30 respectively was prepared as a bore fluid. The components were stirred well and kept to rest for removal of entrained bubbles. Thereafter the solution was filled into a container from where it was purged through the die gap 1 (FIG. 1) of the quadruple orifice spinneret. A gear pump was used for purging this solution at a pre-determined flow rate (g/min).

Die gap 2: The carrier solution was comprised of polyether sulfone (PES) (Ultrason® E6020P), 1-methyl-2-pyrrolidone (NMP), poly(ethylene glycol) (PEG400), and water in a weight basis ratio of 16:40.5:40.5:3, respectively. Polyether sulfone (PES) (Ultrason® E6020P), 1-methyl-2-pyrrolidone (NMP), and poly(ethylene glycol) (PEG400) were dissolved fully and then water was added dropwise in the bottle containing the solution. After addition of water the solution was stirred overnight and then kept to rest for removal of entrained bubbles. The solution was then fed into a container from where it was pressed through the die gap 2 (FIG. 1) of the spinneret. A gear pump was used for pressing this solution at a pre-determined flow rate (g/min).

Die gap 3: Glycerol (299%) was purged through the die gap 3 (FIG. 1) of the spinneret. An infusion pump was used for purging glycerol from its container syringe to the spinneret at a pre-determined flow rate (ml/min).

Die gap 4: A commercially available star block copolymer polystyrene-b-polybutadiene-b-polystyrene was chosen. The commercial grade used in this invention named as StyroClear® GH 62. The polymer was dissolved in tetrahydrofuran (THF) in a weight ratio of 12:88, respectively in a closed bottle by stirring overnight. After dissolution, the bottle of the solution was allowed to stand for some hours for removing entrained bubbles. The solution was filled in a container from where it was pressed through the die gap 4 (FIG. 1) of the spinneret. An infusion pump was used for pressing the solution from its container syringe to the spinneret at a pre-determined flow rate (ml/min).

Figure 4:
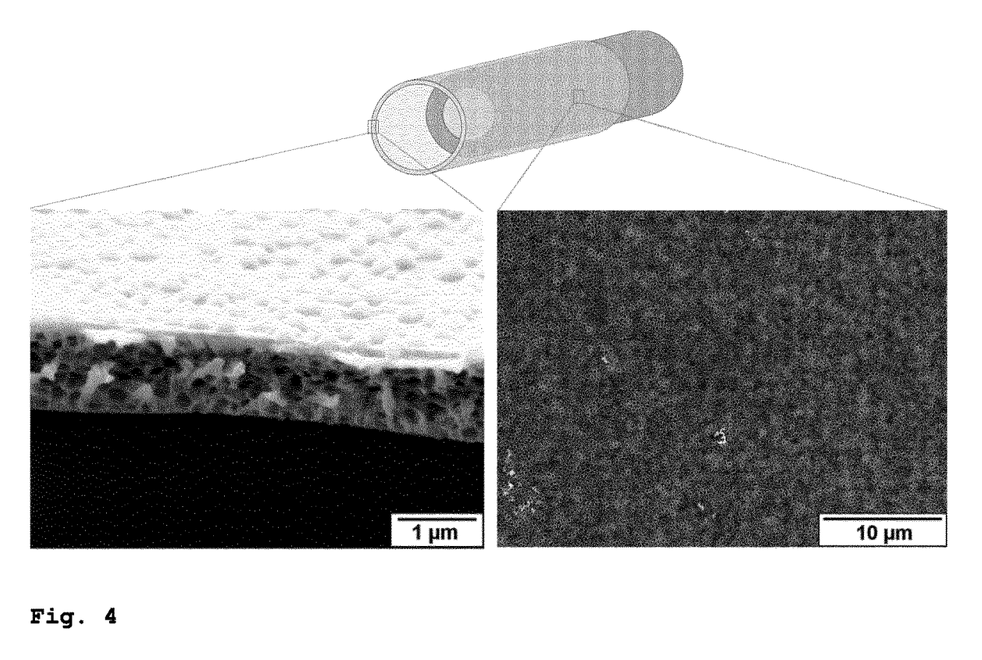
FIG. 4 depicts SEM images of a third hollow fiber of the invention at two locations thereof.

The spinning parameters of this group of experiment are listed in Table 4 and the results are presented in FIG. 4.

TABLE 4

Spinning parameters of Example 3

| Die gap No. | Solution purged | Flow Rate | Air gap distance (cm) |
|---|---|---|---|
| 1 | Water/NMP/PEG400 (40/30/30) | 1 g/min | 10 |
| 2 | PES/NMP/PEG400/Water (16/40.5/40.5/3) | 2 g/min | |

TABLE 4-continued

Spinning parameters of Example 3

| Die gap No. | Solution purged | Flow Rate | Air gap distance (cm) |
|---|---|---|---|
| 3 | Glycerol | 0.05 ml/min | |
| 4 | GH 62/THF (12/88) | 0.05 ml/min | |

Accordingly, the present invention is directed towards a method for the preparation of macroporous or mesoporous polymer films in hollow fiber geometry. The method according to the present invention reliably produces macroporous or mesoporous polymer films in hollow fiber geometry having an ordered pore structure and thickness of preferably about one micrometer. The method involves the purging or casting a polyol adjacent to a film forming polymer solution of at least one copolymer or at least one homopolymer in a suitable solvent before the solution is immersed into a coagulation bath. The methods also require the presence of a carrier solution.

The method makes macroporous or mesoporous film formation in hollow fiber geometry possible with a single step processing method.

The invention claimed is:

1. A method for preparing a polymer film in hollow fiber geometry, comprising:
   a. providing a first polymer solution of at least one copolymer or at least one homopolymer in a volatile solvent, providing a carrier solution comprising a polyether sulfone (PES) in a solvent, providing a bore fluid and providing a polyol which is liquid at room temperature;
   b. pressing the first polymer solution (dope) through a fourth die (4) in a spinneret while simultaneously purging the liquid polyol through a third die (3) encircled by the fourth die (4), pressing the carrier solution through a second die (2) encircled by the third die (3), and purging the bore fluid comprising at least one precipitant through a first, innermost die (1) encircled by the second die (2), and subsequently immersing the pressed polymer solutions into an aqueous precipitation bath, wherein a gap is provided between the spinneret and the aqueous precipitation bath through which the extruded first polymer solution passes enclosing the liquid polyol, the carrier solution and the bore fluid to form a fiber precursor;
   c. precipitating a fiber precursor in the precipitation bath to form the hollow-fiber polymer film enclosing a carrier substrate which includes the polyether sulfone (PES) from the carrier solution; and
   d. optionally, separating the hollow-fiber polymer film from the enclosed carrier substrate.

2. The method of claim 1 wherein the dies have an annular shape.

3. The method of claim 1, wherein the gap between the spinneret and the precipitation bath through which the extruded first polymer solution passes has a length of between 1 cm and 50 cm.

4. The method of claim 1, wherein the carrier solution extruded through the second die comprises polyether sulfone (PES) in admixture with poly(ethylene glycol) (PEG), and/or with N-methyl-2-pyrrolidone (NMP), and optionally with water.

5. The method of claim 1, wherein the liquid polyol is selected from the group consisting of glycerol, ethylene glycol and pentaerythritol.

6. The method of claim 1, wherein the copolymer is selected for the film forming solution from the group consisting of polystyrene-b-poly(4-vinylpyridine) copolymers, poly(α-methylstyrene)-b-poly(4-vinylpyridine) copolymers, poly(para-methylstyrene)-b-poly(4-vinylpyridine) copolymers, poly(t-butylstyrene)-b-poly(4-vinylpyridine) copolymers, poly(trimethylsilylstyrene)-b-poly(4-vinylpyridine) copolymers, polystyrene-b-poly(2-vinylpyridine) copolymers, poly(α-methylstyrene)-b-poly(2-vinylpyridine) copolymers, poly(para-methylstyrene)-b-poly(2-vinylpyridine) copolymers, poly(t-butylstyrene)-b-poly(2-vinylpyridine) copolymers, poly(trimethylsilylstyrene)-b-poly(2-vinylpyridine) copolymers, polystyrene-b-polybutadiene copolymers, poly(α-methylstyrene)-b-polybutadiene copolymers, poly-(para-methylstyrene)-b-polybutadiene copolymers, poly(t-butylstyrene)-b-polybutadiene copolymers, poly(trimethylsilylstyrene)-b-polybutadiene copolymers, polystyrene-b-polyisoprene copolymers, poly(α-methylstyrene)-b-polyisoprene copolymers, poly(para-methylstyrene)-b-polyisoprene copolymers, poly(t-butylstyrene)-b-polyisoprene copolymers, poly(trimethylsilylstyrene)-b-polyisoprene copolymers, polystyrene-b-poly(ethylene-stat-butylene) copolymers, poly(α-methylstyrene)-b-poly(ethylene-stat-butylene) copolymers, poly(para-methylstyrene)-b-poly(ethylene-stat-butylene) copolymers, poly(t-butylstyrene)-b-poly(ethylene-stat-butylene) copolymers, poly(trimethylsilylstyrene)-b-poly(ethylene-stat-butylene) copolymers, polystyrene-b-(ethylene-alt-propylene) copolymers, poly(α-methylstyrene)-b-(ethylene-alt-propylene) copolymers, poly(para-methylstyrene)-b-(ethylene-alt-propylene) copolymers, poly(t-butylstyrene)-b-(ethylene-alt-propylene) copolymers, poly(trimethylsilylstyrene)-b-(ethylene-alt-propylene) copolymers, polystyrene-b-polysiloxane copolymers, poly(α-methylstyrene)-b-polysiloxane copolymers, poly(para-methylstyrene)-b-polysiloxane copolymers, poly(t-butylstyrene)-b-polysiloxane copolymers, poly(trimethylsilylstyrene)-b-polysiloxane copolymers, polystyrene-b-polyalkylene oxide copolymers, poly(α-methylstyrene)-b-polyalkylene oxide copolymers, poly(para-methylstyrene)-b-polyalkylene oxide copolymers, poly(t-butylstyrene)-b-polyalkylene oxide copolymers, poly(trimethylsilylstyrene)-b-polyalkylene oxide copolymers, polystyrene-b-poly-ε-caprolactone copolymers, poly(α-methylstyrene)-b-poly-ε-caprolactone copolymers, poly(para-methylstyrene)-b-poly-ε-caprolactone copolymers, poly(t-butylstyrene)-b-poly-ε-caprolactone copolymers, poly(trimethylsilylstyrene)-b-poly-ε-caprolactone copolymers, polystyrene-b-poly(methyl methacrylate) copolymers, poly(α-methylstyrene)-b-poly(methyl methacrylate) copolymers, poly(para-methylstyrene)-b-poly(methyl methacrylate) copolymers, poly(t-butylstyrene)-b-poly(methyl methacrylate) copolymers, poly(trimethylsilylstyrene)-b-poly(methyl methacrylate) copolymers, polystyrene-b-poly(methyl acrylate) copolymers, poly(α-methylstyrene)-b-poly(methyl acrylate) copolymers, poly(para-methylstyrene)-b-poly(methyl acrylate) copolymers, poly(t-butylstyrene)-b-poly(methyl acrylate) copolymers, poly(trimethylsilylstyrene)-b-poly(methyl acrylate), polystyrene-b-poly(hydroxyethyl methacrylate) copolymers, poly(α-methylstyrene)-b-poly(hydroxyethyl methacrylate) copolymers, poly(para-methylstyrene)-b-poly(hydroxyethyl methacrylate) copolymers, poly(t-butylstyrene)-b-poly(hydroxyethyl methacrylate) copolymers, poly(trimethylsilylstyrene)-b-poly(hydroxyethyl methacrylate) copolymers, polystyrene-b-polyacrylamide copolymers, poly(α-methylstyrene)-b-polyacrylamide copolymers, poly(para-methylstyrene)-b-polyacrylamide copolymers, poly(t- butylstyrene)-b-polyacrylamide copolymers, poly(trimethyl-silylstyrene)-b-polyacrylamide copolymers, polystyrene-b-poly(vinyl alcohol) copolymers, poly($\alpha$-methylstyrene)-b-poly(vinyl alcohol) copolymers, poly(para-methylstyrene)-b-poly(vinyl alcohol) copolymers, poly(t-butylstyrene)-b-poly(vinyl alcohol) copolymers, poly(trimethylsilylstyrene)-b-poly(vinyl alcohol) copolymers, polystyrene-b-polyvinylpyrrolidone copolymers, poly($\alpha$-methylstyrene)-b-polyvinylpyrrolidone copolymers, poly(para-methylstyrene)-b-polyvinylpyrrolidone copolymers, poly(t-butylstyrene)-b-polyvinylpyrrolidone copolymers, poly(trimethylsilylstyrene)-b-polyvinyl-pyrrolidone copolymers, polystyrene-b-poly-vinylcyclohexane copolymers, polystyrene-b-poly-vinylcyclohexane copolymers, polystyrene-b-poly-vinylcyclohexane copolymers, polystyrene-b-poly-vinylcyclohexane copolymers, and poly(trimethylsilylstyrene)-b-polyvinyl-cyclohexane copolymers.

7. The method according to claim 1, wherein the copolymer or homopolymer is selected for the film forming solution from the group consisting of cellulose acetate (CA), cellulose acetate butyrate (CAB), polystyrene (PS), polyether sulfone (PES), polysulfone (PSf), polyphenylene sulfone (PPSU), polyetherimide (PEI), poly-acrylonitrile (PAN), and polyvinyledenefluoride (PVDF).

8. The method according to claim 1, wherein the solvent for the porous film forming polymer is selected from the group consisting of diethyl ether, acetonitrile, 1,4-dioxane, acetone, carbon disulfide, acetone, tetrahydrofuran, any other low boiling solvent, and a mixture of high boiling solvent/s and low boiling solvent/s.

9. The method according to claim 1, wherein the porous film forming polymer solution further comprises a compound which contains at least one metal ion.

10. A method for preparing a polymer film in hollow fiber geometry, consisting of the following steps:
   a. providing a first polymer solution of at least one copolymer or at least one homopolymer in a volatile solvent, providing a carrier solution comprising a polyether sulfone (PES) in a solvent, providing a bore fluid and providing a polyol which is liquid at room temperature;
   b. pressing the first polymer solution (dope) through a fourth die (4) in a spinneret while simultaneously purging the liquid polyol through a third die (3) encircled by the fourth die (4), pressing the carrier solution through a second die (2) encircled by the third die (3), and purging the bore fluid comprising at least one precipitant through a first, innermost die (1) encircled by the second die (2), and subsequently immersing the pressed polymer solutions into an aqueous precipitation bath, wherein a gap is provided between the spinneret and the aqueous precipitation bath through which the extruded first polymer solution passes enclosing the liquid polyol, the carrier solution and the bore fluid to form a fiber precursor;
   c. precipitating a fiber precursor in the precipitation bath to form the hollow-fiber polymer film enclosing a carrier substrate which includes the polyether sulfone (PES) from the carrier solution; and
   d. optionally, separating the hollow-fiber polymer film from the enclosed carrier substrate.

11. The method of claim 2, wherein the gap between the spinneret and the precipitation bath through which the extruded first polymer solution passes has a length of between 1 cm and 50 cm.

* * * * *